Jan. 15, 1929.  1,698,961
R. MUELLER
FAUCET
Filed Nov. 3, 1924   2 Sheets-Sheet 1
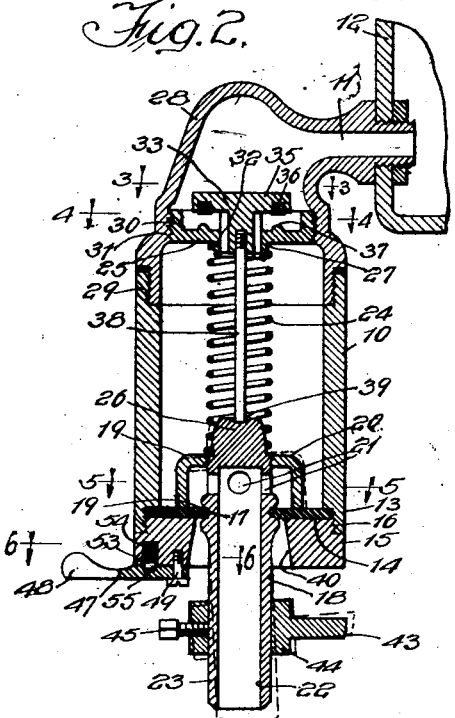
Fig. 2.
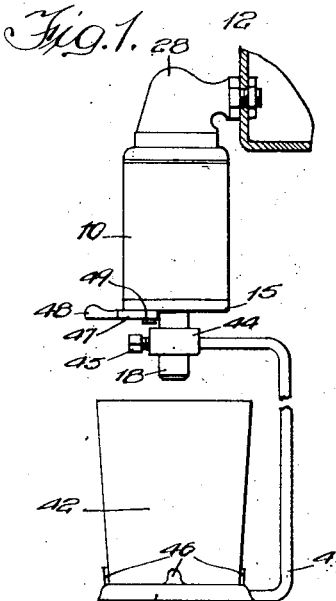
Fig. 1.
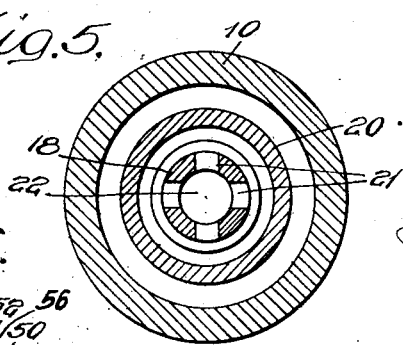
Fig. 5.
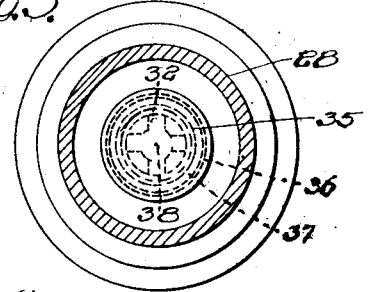
Fig. 3.
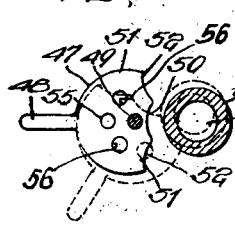
Fig. 6.
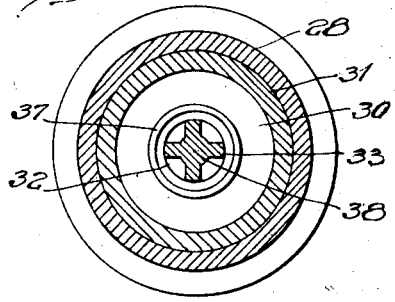
Fig. 4.
Fig. 7.
Witnesses:
W. F. Kilroy
Harry L. White
Inventor:
Rudolph Mueller
Edward Fay Wilson
By
Atty.

Jan. 15, 1929.
R. MUELLER
FAUCET
Filed Nov. 3, 1924
1,698,961
2 Sheets—Sheet 2
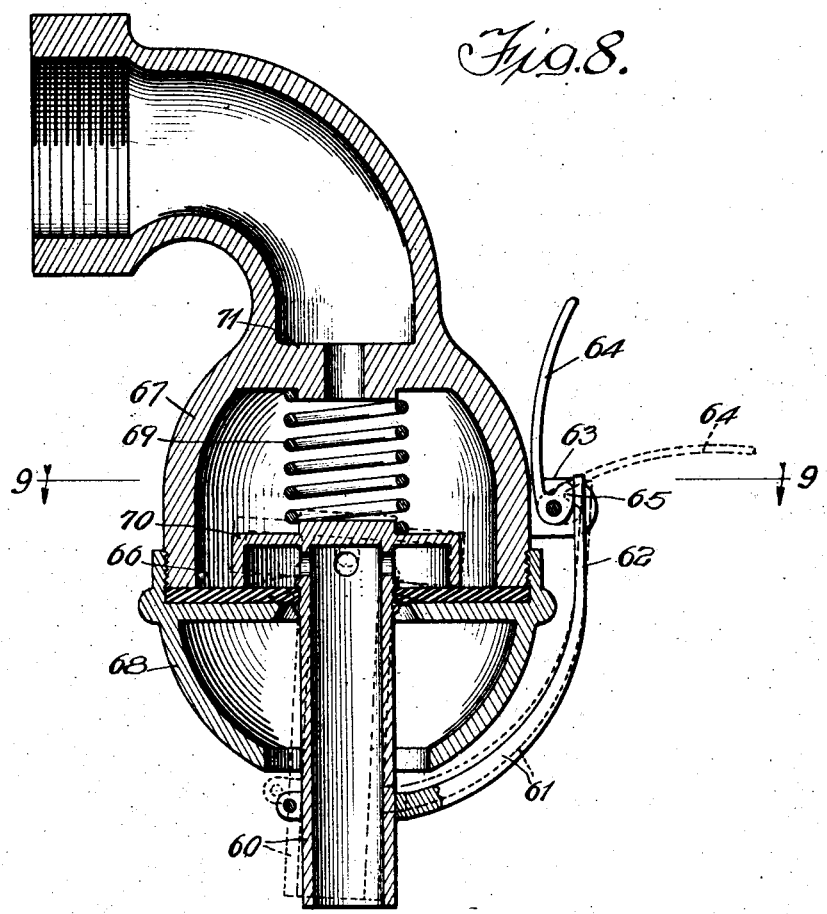
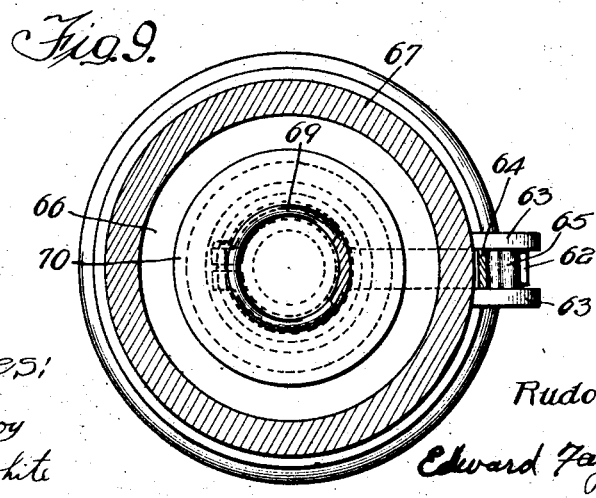
Witnesses:
W. F. Kilroy
Harry R. L. White
Inventor:
Rudolph Mueller
Edward Fay Wilson
By
Atty Patented Jan. 15, 1929.

1,698,961

UNITED STATES PATENT OFFICE.

RUDOLPH MUELLER, OF CHICAGO, ILLINOIS.

FAUCET.

Application filed November 3, 1924. Serial No. 747,615.

My invention relates to improvements in faucets and has special reference to faucets of the kind which are particularly adapted to be opened by use of the tumbler which is to be filled, especially with water.

The object of my invention is to provide a durable, easily operable faucet, all of the parts of which are of substantial size and durability and one which even a person unacquainted with its operation thereof could not help opening it at once by the use of a tumbler to be filled.

My faucet, as those usually employed for this purpose, is automatically closed upon the release or withdrawal of the tumbler. A particularly valuable feature of my invention resides in the provision of an auxiliary check valve which automatically closes the faucet upon the failure or removal of the automatic flow parts or valve.

In connection with the automatic mechanism or devices I provide as an additional convenience a simple means for easily setting the faucet for continuous flow and which can as easily be released to bring the automatic tumbler operation into effect.

My invention will be more readily understood by reference to the accompanying drawings forming part of this specification and in which:—

Figure 1, is a side elevation of a faucet embodying my invention in a preferred form and shown mounted upon a liquid supply tank;

Figure 2, is a vertical central sectional view of the faucet;

Figures 3, 4, and 5 are horizontal sections on the lines 3—3, 4—4, and 5—5 respectively of Figure 2;

Figure 6, is a fragmentary horizontal section on the line 6—6 of Figure 2;

Figure 7, is a view similar to Figure 1 and illustrating a slight modification;

Figure 8, is a sectional view similar to Figure 2 and illustrating a slight modification of my invention; and Figure 9, is a horizontal section on the line 9—9 of Figure 8.

In said drawings, 10 illustrates the casing of the faucet. The casing is cylindrical and has an inlet 11 at its top for the admission of the liquid to be delivered. The inlet is connected with a supply tank 12 or other source of supply of liquid under pressure.

The casing proper is open at its lower end 13 and the open end is closed by a flexible diaphragm 14, preferably made of rubber and which is clamped tightly at its periphery between the lower end of the casing and a removable head 15 which may be secured to the lower end of the casing by having a threaded connection 16 therewith, as shown. The rubber diaphragm or disk 14 is provided with a central opening 17 in which a delivery nozzle 18 is mounted. The nozzle is provided with a circumferential groove 17 in which the inner periphery of the disk 14 is held, the connection being such that no leakage occurs at this point. The delivery tube extends above and below the disk, its upper end carries a hood valve member 19 which is secured to the upper end of the tube and has a circumferential skirt 20 which extends down and is adapted to seat on the disk 14 and prevent the liquid flowing from the interior of the casing to the delivery tube. The portion of the tube 18 within the hood 19 is provided with radial holes 21 which connect the central longitudinal opening 22 of the tube with the space beneath the hood 19. The lower end of the delivery opening 22 is freely open. When the faucet is installed and the fluid under pressure is admitted to the casing the pressure forces the hood 19 down and seats its lower edge upon the disk 14, thus effectively shutting off all flow of liquid from the faucet. To open the faucet for the flow of liquid therefrom it is merely necessary to force the lower end 23 of the delivery tube slightly to one side, thus tipping the hood 19 and lifting its lower edge free of the disk at one side, as shown in the dotted lines. As soon as the tube 18 is again released the pressure again seats the hood firmly and stops the flow.

To assure the firm seating of the hood and the closing of the faucet, I preferably provide additional pressure means, in the form of a compression spring 24 seated at its lower end upon the top of the hood and seated at its upper end upon a shoulder 25 provided in the upper part of the casing. I provide the hood with a spring centering projection 26 to hold the lower end of the spring central and the upper end is centered by a projection 27 on the shoulder 25. In the form shown the top 28 of the casing is removable from the casing, being joined thereto by a threaded connection 29.

Within the top part 28 I provide a transverse wall 30 which forms the shoulder 25 and which is entered into the top part 28 from below, being preferably secured in place by a screw-threaded connection 31. This wall has a central opening 32 within the centering projection 27 and which connects the interior of the top part 28 with the body of the casing. For the purpose of stopping the flow of liquid through the faucet in case it is necessary to remove the diaphragm 14, I provide a check valve 33 the stem 34 of which extends down through the opening 32. This stem is the usual Greek-cross section providing ample flow passage for liquid. The head 35 of the valve 33 extends out over the wall 30 and is provided on its under side with a soft seating ring 36 adapted to seat on a rounded circumferential valve seat 37 when the valve is free to be seated by the fluid pressure, normally the valve is held free of its seat by a downwardly projecting rod 38 which is rigidly secured at its upper end to the valve and is made of such length that its lower end 39 rests upon the top surface of the projection 26. The top surface of the projection 26 is provided with a centering depression 39 for receiving and centering the lower end of the stem 38. It will readily be seen that if the diaphragm 14 were to be removed the hood valve 19 would be pushed down by the spring 24 and thus the check valve 33 would be relieved of support and would be immediately seated by the pressure in the upper part of the casing.

The lower head 15 of the casing is provided with a central opening 40 through which the delivery stem 18 projects and which is coned or widened out toward the lower end to permit the free tipping of the stem 18, as hereinbefore described, for opening the faucet.

For conveniently forcing the delivery stem to one side to open the faucet, I provide a stand or support 41 for a tumbler 42, arranged centrally below the stem 18 and connected thereto by a bracket arm 43 which rises from the base 41 at one side so as to permit the ready placement of the tumbler upon the base. The arm 43 extends inwardly at its upper end and has a hub 44 adapted to be clamped tightly upon the stem 18, preferably by a set screw 45. The base 41 is provided with upstanding projections 46, forming a socket within which the bottom of the tumbler 42 is received and by means of which the stem can be readily pushed over by side pressure applied to the tumbler in a readily obvious manner.

It is sometimes desirable to hold the faucet open for some time, as in filling quite a number of tumblers. For this purpose I provide simple means for forcing the delivery tube 18 to one side and retaining it there until it is desired to release it. This means, as shown in the drawings, consists of a lever 47 pivoted to the bottom of the head 15 and having a handle 48 which extends out beyond the edge of the head. The lever is pivoted to the head by a pivot 49 near its inner end to swing in a horizontal plane. The lever has a rounded notch 50 at its inner end which is substantially concentric with the lower end of the tapered opening 40 so that normally the tipping of the nozzle 18 by a tumbler will not be hindered. The lever is widened out at each side at its inner end, as shown at 51, and each wing is provided with a rounded notch 52 adapted to be swung around to engage the tube 18 and push it over. These notches 52 fit the outer surface of the tube, and once the tube is engaged in either thereof it will remain therein until released. The arrangement is such that when the tube is thus engaged it is forced over to one side, sufficient to open the faucet, as explained. To retain the lever 47 in its normal central position, I provide a ball 53 with a compression spring 54 above it and adapted to engage in a depression 55 provided in the upper surface of the lever 47. Obviously other depressions 56 can be provided in the lever to be engaged by the ball to hold the lever in faucet open position.

In Figure 7, I have illustrated a form of casing where the liquid enters directly into the body of the casing instead of into the top as heretofore described, as shown at 57. Obviously in this form the check valve 33 cannot be used.

In Figures 8 and 9, I have illustrated a modified form of my invention. This modified form is not provided with a tumbler receiver but with a simple lever by which the delivery tube 60 of this form of faucet can be slightly deflected for opening the faucet. As shown, this arrangement comprises an arm 61 secured rigidly at one end to the delivery tube 60 and extending up alongside of the body of the faucet. The free end 62 of the arm 61, is received between two lugs 63 projecting out from the side of the body of the faucet. It is obvious that by moving the free end 62 of the arm 61 the delivery tube 60 will be forced out of its normal position and the diaphragm distorted as has been described.

I provide a simple means for forcing the free end of the arm 61 out of its normal position and retaining it in faucet open position. This means comprises a hand lever 64, having an end arranged between the lugs 63 and pivotally mounted upon said lugs. The lever 64 has a cam projection 65 which is adapted to engage the free end of the arm 61 and force same outwardly when the lever 64 is swung downwardly, as shown in dotted lines, Figure 8. The projection 65 is preferably arranged to pass centers when it is pulled down, whereby the faucet remains open until the lever 64 is swung up again. When the lever 64 is lifted the free end of the arm 61 is forced inwardly by the resiliency of the diaphragm, and the cam projection is arranged so that it passes centers on the upward movement of the lever. By this means the arm 61 retains the lever 64 in its upper or faucet closed position.

The internal construction of the faucet is similar to that already described. The delivery tube is mounted in a rubber-diaphragm 66 which is clamped against the lower open end of the body 67 by head 68 which is screwed onto the body. In this form I also interpose a faucet closing spring 69 between the valve head 70 and a partition wall 71.

It is obvious that the tumbler support shown in Figure 1 could be secured upon the delivery tube 60.

As many modifications of my invention will readily suggest themselves to one skilled in the art, I do not limit or confine my invention to the specific details of construction and operation herein shown and described.

I claim:

In a faucet of the kind described, a discharge tube mounted in a flexible wall, means normally sealing the inner end of the tube and adapted to be opened by inclining the tube out of its normal position, a support rigid with the tube for receiving a vessel to be filled and adapted to be moved from its normal position by sidewise pressure on the vessel to be filled.

In testimony whereof, I have hereunto set my hand, this 30th day of October, 1924.

RUDOLPH MUELLER.